US012623554B2

(12) United States Patent (10) Patent No.: US 12,623,554 B2
Li et al. (45) Date of Patent: May 12, 2026

(54) SELF-BALANCING POWER SYSTEM, SELF-BALANCING CONTROL METHOD, SELF-BALANCING CONTROL SYSTEM, AND SELF-BALANCING VEHICLE

(71) Applicant: HORWIN INC., Changzhou (CN)

(72) Inventors: Wei Li, Changzhou (CN); Panhua Zeng, Changzhou (CN)

(73) Assignee: HORWIN INC., Changzhou (CN)

( * ) Notice: Subject to any disclaimer, the term of this patent is extended or adjusted under 35 U.S.C. 154(b) by 0 days.

(21) Appl. No.: 18/938,724

(22) Filed: Nov. 6, 2024

(65) Prior Publication Data

US 2025/0065732 A1 Feb. 27, 2025

Related U.S. Application Data

(63) Continuation of application No. PCT/CN2023/138084, filed on Dec. 12, 2023.

(30) Foreign Application Priority Data

Sep. 24, 2023 (CN) .......................... 202311234206.6

(51) Int. Cl.
  *H02K 7/112* (2006.01)
  *B60L 15/20* (2006.01)
  *B60L 50/60* (2019.01)
(52) U.S. Cl.
  CPC .......... *B60L 15/2054* (2013.01); *B60L 50/66* (2019.02); *B60L 2200/12* (2013.01); (Continued)

(58) Field of Classification Search
  CPC ............. B60L 2260/34; B60L 2200/16; B60L 2240/22; B60L 2220/42; B60L 15/2054; (Continued)

(56) References Cited

U.S. PATENT DOCUMENTS 11,591,041 B2 2/2023 Weiss
2017/0285650 A1 10/2017 Qian et al.
(Continued)

FOREIGN PATENT DOCUMENTS

CN 107508431 A * 12/2017 ........... H02K 11/215
CN 114074736 A * 2/2022 .............. B62M 6/90
(Continued)

OTHER PUBLICATIONS

Machine translation of CN114074736A (Year: 2025).*
Machine translation of CN10708431A (Year: 2025).*

*Primary Examiner* — Stacey A Fluhart

(57) ABSTRACT

A self-balancing power system includes a first drum unit, a second drum unit, a first battery pack, a second battery pack, a first power motor, a second power motor, a power output set and an anti-torque power set, where the power output set and the anti-torque power set are in transmission connection to the first drum unit and the second drum unit respectively from two sides of the first drum unit and the second drum unit, the power output set is configured to provide output power of the self-balancing power system, and the anti-torque power set is configured to provide anti-torque of the self-balancing power system. The present disclosure further relates to a self-balancing control method, a self-balancing control system and a self-balancing vehicle. At least stability and heat dissipation effect of the self-balancing power system can be improved.

32 Claims, 10 Drawing Sheets

1000

(52) U.S. Cl.
 CPC ..... *B60L 2240/22* (2013.01); *B60L 2240/421* (2013.01); *B60L 2240/423* (2013.01); *B60L 2240/48* (2013.01)

(58) Field of Classification Search
 CPC ......... B60L 15/20; B62K 11/007; B62K 1/00; H02K 7/116; F16H 2048/104; F16H 2200/2005
 See application file for complete search history.

(56) References Cited

U.S. PATENT DOCUMENTS

2018/0029661 A1     2/2018  Ha et al.
2018/0128048 A1*    5/2018  Pinese ....................... E06B 9/72

FOREIGN PATENT DOCUMENTS

CN          216805694 U  *  6/2022
WO     WO-2018010669 A1  *  1/2018  .............. H02K 7/00

* cited by examiner

SELF-BALANCING POWER SYSTEM, SELF-BALANCING CONTROL METHOD, SELF-BALANCING CONTROL SYSTEM, AND SELF-BALANCING VEHICLE

CROSS-REFERENCE TO RELATED APPLICATIONS

This application is a continuation of International Patent Application No. PCT/CN2023/138084 with a filing date of Dec. 12, 2023, designating the United States, now pending, and further claims priority to Chinese Patent Application No. 202311234206.6 with a filing date of Sep. 24, 2023. The content of the aforementioned applications, including any intervening amendments thereto, is incorporated herein by reference.

TECHNICAL FIELD

The present disclosure relates to a self-balancing technology, in particular to the technical field of balancing vehicles. In particular, the present disclosure relates to a self-balancing power system, a self-balancing control method, a self-balancing control system and a self-balancing vehicle.

BACKGROUND

This section merely provides background information related to the present disclosure and is not necessarily the prior art.

With the development of technologies for two-wheeled vehicles, such as motorcycles, the self-balancing performance of the vehicle becomes increasingly important. Currently, the technical solutions available for the self-balancing technology of two-wheeled vehicles include a center of gravity transfer technology, an electronic control steering technology, a gyroscope stabilizing technology and an anti-torque control technology. The center of gravity transfer technology adopts a swing structure of a rear wheel and a body in order to maintain balance through center of gravity transfer when the body reaches a overturning attitude, but the center of gravity transfer technology is weak in terms of anti-interference ability, and it is difficult to maintain balance in a high-speed driving condition. The electronic control steering technology uses a computer to control steering and balancing, but it is actually impossible to achieve self-balancing at low speeds. The gyroscope stabilizing technology utilizes the principle that a high-speed rotating gyro can remain vertically stable to allow a two-wheeled vehicle to self-balance, but this technology requires additional space and consumes higher power. The anti-torque control technology adopts a power/anti-torque motor two-in-one method with an anti-torque/power conversion system to reduce the occupied space and body weight, so as to improve a certain range capability.

However, current anti-torque control technology may suffer from the following technical problems. First, the anti-torque control system has a large number of internal parts, which complicates the overall structure and may be detrimental to the balance of the system itself, and thus to the balance of the two-wheeled vehicle. Second, if a number of motors and controllers are arranged in the same internal space, it may not be conducive to the heat dissipation of the motors and controllers, and may in turn affect the heat dissipation effect of the entire system.

SUMMARY

An objective of the present disclosure is to provide a self-balancing power system that at least partially solves the above problems. The objective may be achieved by the following technical solutions.

In a first aspect, the present disclosure provides a self-balancing power system. The self-balancing power system includes a first drum unit, a second drum unit, a first battery pack, a second battery pack, a first power motor, a second power motor, a power output set and an anti-torque power set, where the power output set and the anti-torque power set are in transmission connection to the first drum unit and the second drum unit respectively from two sides of the first drum unit and the second drum unit, the power output set is configured to provide output power of the self-balancing power system, and the anti-torque power set is configured to provide anti-torque of the self-balancing power system. The self-balancing power system according to the present disclosure may be configured, for example, to improve integration and self-balancing performance of a two-wheeled vehicle by separately arranging the power motors inside different drum units and arranging the power output set and the anti-torque power set outside the drum unit, and/or integrating functions of power output and anti-torque power output of the motors, such that stability and a heat dissipation effect of the self-balancing power system may be at least improved, and/or a space occupancy and energy consumption of a two-wheeled vehicle may be reduced.

In a second aspect, the present disclosure provides a self-balancing control method, configured to control the above self-balancing power system. The self-balancing control method includes: an obtaining step including obtaining a current speed, a preset speed, an inclination angle and a preset inclination angle range of the self-balancing power system; a determination step including determining whether the current speed is consistent with the preset speed, and determining whether the inclination angle falls within the preset inclination angle range; and a control step including: controlling a first power motor and a second power motor to output torque in a same direction and with a same size when it is determined that the current speed is consistent with the preset speed and the inclination angle does not fall within the preset inclination angle range, and making a power output set output no power and the anti-torque power set output anti-torque; alternatively, controlling a first power motor and a second power motor to output no torque when it is determined that the current speed is consistent with the preset speed and the inclination angle falls within the preset inclination angle range, and making the power output set output no power and the anti-torque power set output no anti-torque; alternatively, controlling a first power motor and a second power motor to output torque in opposite directions and with a same size when it is determined that the current speed is inconsistent with the preset speed and the inclination angle falls within the preset inclination angle range, and making a power output set output power and the anti-torque power set output no anti-torque; and alternatively, controlling a first power motor and a second power motor to output torque with different sizes when it is determined that the current speed is inconsistent at the preset speed and the inclination angle does not fall within the preset inclination angle range, and making a power output set output power and the anti-torque power set output anti-torque. The self-balancing control method according to the present disclosure may be configured to control an operating state of the above self-balancing power system, so as to at least facilitate the control and application of the self-balancing power system.

In a third aspect, the present disclosure provides a self-balancing control system, configured to implement the above self-balancing control method. The self-balancing control system further includes: an obtaining module configured to implement an obtaining step; a processing module configured to implement a determination step; and a control module configured to implement a control step. The self-balancing control system according to the present disclosure may facilitate control implementation of the self-balancing power system.

In a fourth aspect, the present disclosure provides a self-balancing vehicle. The self-balancing vehicle includes the above self-balancing power system and/or the above self-balancing control method and/or the above self-balancing control system, and is, for example, a two-wheeled vehicle, in particular a motorcycle or an electric bicycle, preferably an electric motorcycle. The self-balancing vehicle according to the present disclosure may be adapted to the above self-balancing power system and/or the self-balancing control method and/or the self-balancing control system, such that effects such as improving self-balancing performance, reducing energy consumption, and reducing space occupancy may be achieved.

BRIEF DESCRIPTION OF DRA WINGS

Various other advantages and benefits will become apparent to those of ordinary skill in the art through reading the following detailed description of the preferred embodiments. The drawings are for purposes of illustrating preferred embodiments merely and are not to be considered limiting of the present disclosure. In all of the drawings, identical reference numerals are used to represent identical components. In the drawings:

FIG. 1 is an illustrative sectional view of a self-balancing power system according to an embodiment of the present disclosure;

DETAILED DESCRIPTION OF THE EMBODIMENTS

Figure 2:
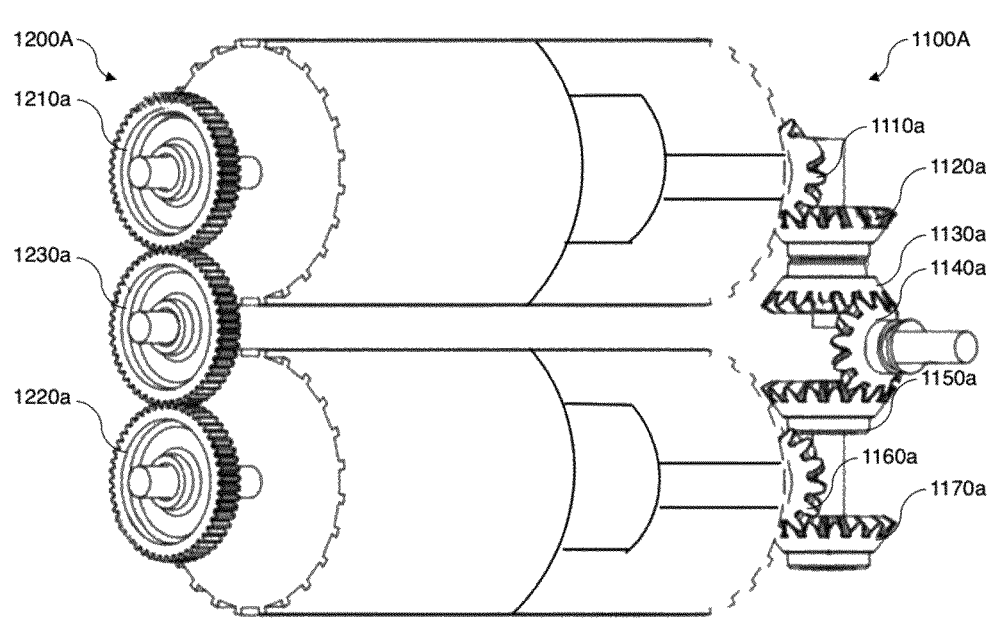
FIG. 2 is an illustrative perspective view of a self-balancing power system according to an embodiment of the present disclosure.

Illustrative embodiments of the present disclosure are described in more detail below with reference to the drawings. Although illustrative embodiments of the present disclosure are shown in the drawings, it should be understood that the present disclosure may be embodied in various forms and should not be limited to the embodiments set forth herein. Rather, these embodiments are provided to more thoroughly understand the present disclosure, and to fully convey the scope of the present disclosure to those skilled in the art.

It should be understood that the terms used herein are for the purpose of describing particular illustrative embodiments only and is not intended to be limiting. The expressions "a", "an", and "the" as used herein may also be meant to include plural forms unless the context clearly indicates otherwise. The terms "comprise", "include" and "have" are inclusive and therefore specify the existence of stated features, elements, and/or components, but do not exclude the existence or addition of one or more other features, elements, components, and/or their groups.

Although the terms such as first, second, etc. may be used herein to describe various elements, components, regions, layers and/or sections, these elements, components, regions, layers and/or sections should not be limited by these terms. These terms may be merely only to distinguish one element, component, region, layer or section from another region, layer or section. The terms such as "first", "second" and "third" and other numerical terms do not imply a sequence or order when used herein unless the context clearly indicates otherwise. Moreover, in the description of the present disclosure, unless otherwise explicitly specified and defined, the terms "arrange" and "connect" should be understood in a broad sense, for example, they may be a fixed connection, a detachable connection, an integrated connection, a direct connection, or an indirect connection via an intermediate medium. Moreover, in the description of the present disclosure, unless otherwise explicitly specified and limited, the term "fix" means that several components are coupled or fixed together according to technical requirements, so as to achieve mechanical assembly, such as flat key fixing, under the condition of maintaining correct relative positions and mutual relations. For those skilled in the art, the specific meaning of the above terms in the present disclosure can be understood according to specific circumstances.

For ease of description, spatially mutual relation terms may be used herein to describe a relation of one element or feature to another element or feature as illustrated in the figures, such as, for example, "upper", "middle", "lower", "inner", "close", etc. Such spatially mutual relation terms are intended to include different orientations of a device in use or operation other than those depicted in the figures. For example, in case that a device in the figures is turned over, an element described as "below" or "under" other elements or features is then oriented as "above" or "on" other elements or features. Thus, the illustrative term "below" may include both the orientation of above and below. The device may also be oriented (rotated 90 degrees or in other directions) and the spatially mutual relation descriptors used herein interpret it accordingly.

Examples of the present disclosure are described below with reference to the illustrative drawings.

Figure 1:
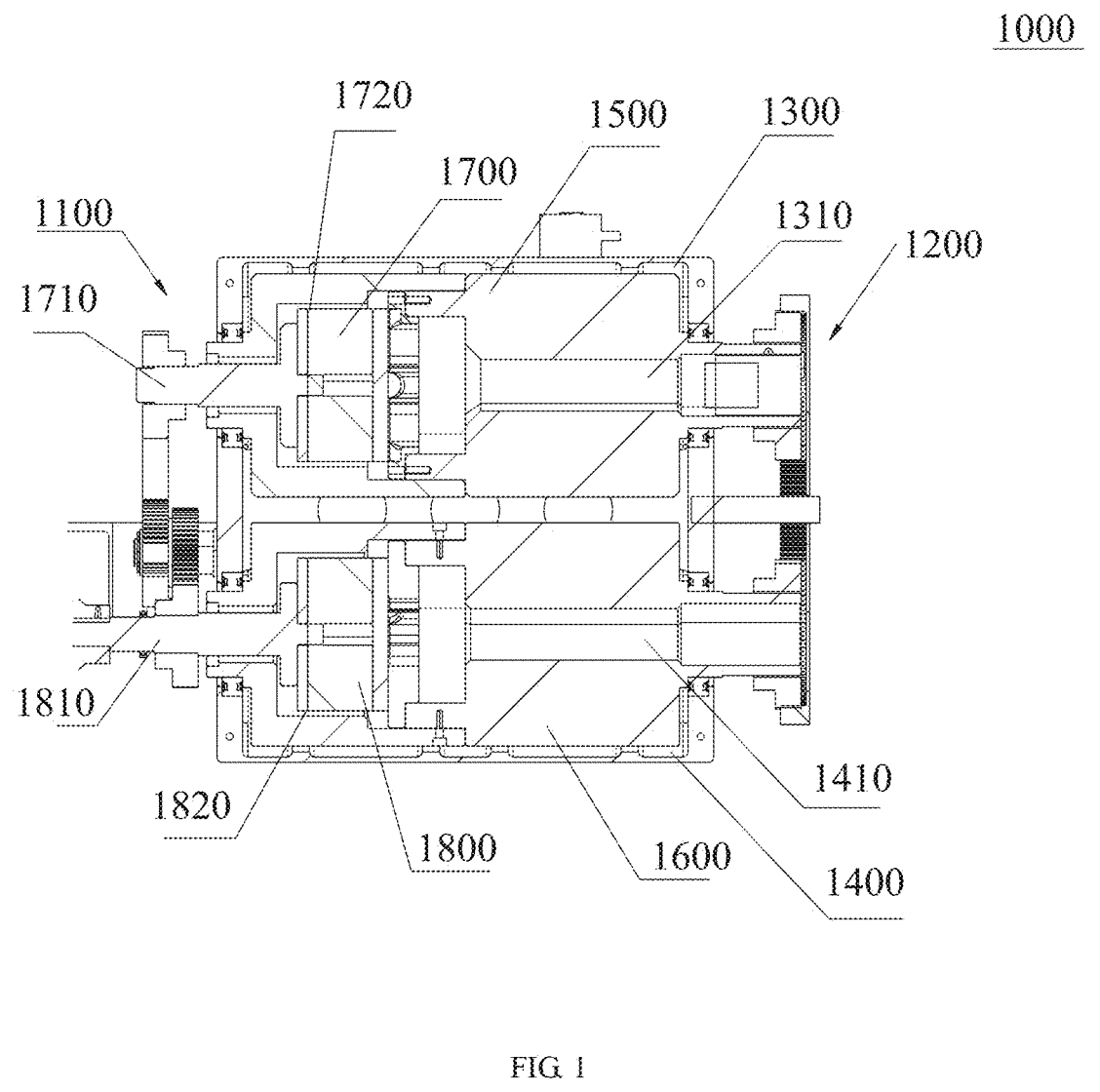

FIG. 1 is an illustrative sectional view of a self-balancing power system 1000 according to an embodiment of the present disclosure. The self-balancing power system includes a first drum unit 1300, a second drum unit 1400, a first battery pack 1500, a second battery pack 1600, a first power motor 1700, a second power motor 1800, a power output set 1100 and an anti-torque power set 1200.

In the embodiment shown in FIG. 1, the first drum unit 1300 may include a first transmission shaft 1310 extending to the outside of the first drum unit. The first transmission shaft may extend outward from the first drum unit and be in transmission connection to at least a part of the anti-torque power set 1200, such that output torque of the first transmission shaft may be transmitted to the anti-torque power set. The first transmission shaft and the first drum unit are connected together in a relatively nonrotatable manner. Preferably, the first power motor 1700 may be arranged inside the first drum unit 1300. Herein, the first power motor 1700 may include a first motor output shaft 1710 and a first motor housing 1720, where the first motor housing 1720 is connected to the first drum unit in a relatively nonrotatable manner, and the first motor output shaft 1710 is rotatable relative to the first drum unit. Moreover, the motor output shaft extends outward from the first drum unit and may be transmission connection to at least a part of the power output set 1100, such that output torque of the first motor output shaft may be transmitted to the power output set.

Similarly, the second drum unit 1400 may include a second transmission shaft 1410 arranged at the outside. The second transmission shaft may extend outward from the second drum unit and may be in transmission connection to at least a part of the anti-torque power set 1200, and the second transmission shaft and the second drum unit are connected together in a relatively nonrotatable manner. Preferably, the second power motor 1800 may be arranged inside the second drum unit 1400. Herein, the second power motor 1800 may include a second motor output shaft 1810 and a second motor housing 1820, where the second motor housing 1820 is connected to the second drum unit in a relatively nonrotatable manner, and the second motor output shaft is connected to the second drum unit in a relatively rotatable manner. Moreover, the second motor output shaft 1810 may extend to the outside of the second drum unit and be in transmission connection to at least a part of the power output set, such that output torque of the second motor output shaft may be transmitted to the power output set.

Within the scope of the present disclosure, it should be understood that the "motor housing" and "motor output shaft" may also be a rotor and a stator of the motor, which is not necessary. It is important that both the rotor and the stator (or the motor housing and the motor output shaft) of the motor have separate rotation degrees of freedom, in other words, the motor housing (or, for example, the motor stator) can rotate freely independently of the motor output shaft, and the motor output shaft (or, for example, the motor rotor) can also rotate freely independently of the motor housing.

Advantageously, some structures of the self-balancing power system may be arranged outside a main part of the system, and different power motors may be arranged in different housings, such that at least some of the following technical effects may be achieved. Firstly, by arranging different power motors inside different drum units, flexible layout of the self-balancing power system can be facilitated, for example, the drum units can be arranged in parallel in a vertical or horizontal direction according to requirements, such that a space utilization rate can be improved, and endurance can be further improved. Secondly, by arranging the structures of the power output set and the anti-torque power set outside the drum units, stability and a heat dissipation effect of the self-balancing power system can be improved.

Preferably, the first battery pack 1500 may be fixed to the first drum unit, and the second battery pack 1600 may be fixed to the second drum unit. Particularly preferably, the first battery pack 1500 and the second battery pack 1600 may be respectively mounted close to or adjacent to a side of the first drum unit and the second drum unit on which the anti-torque power set is mounted, or directly mounted on a side of the first drum unit and the second drum unit on which the anti-torque power set is mounted. Thus, the first battery pack 1500 and the second battery pack 1600 may be used as at least a part of a counterweight (for example, for rotation) of the anti-torque power set 1200, such that an anti-torque effect may be increased, and a system space may be fully used.

Advantageously, in the self-balancing power system 1000, the battery pack and/or the power motor may be configured to provide kinetic energy for the entire self-balancing power system. The power output set may provide power output for the entire system or the self-balancing power system by means of, for example, rotation of the first motor output shaft and the second motor output shaft. The anti-torque power set may provide anti-torque output for the entire system or the self-balancing power system through, for example, rotation of the first transmission shaft and the second transmission shaft. Herein, the power output set 1100 and the anti-torque power set 1200 are connected to two sides of the two drum units respectively and are in transmission connection to the two drum units. Although in the drawings, the power output set 1100 is in transmission connection to the first motor output shaft and the second motor output shaft, and the anti-torque power set 1200 is in transmission connection to the first transmission shaft and the second transmission shaft, it should be understood that the connections and/or positions of the power output set and the anti-torque power set on two sides of the drum units may be interchanged, that is, the anti-torque power set may also be in transmission connection to the first motor output shaft and the second motor output shaft if desired, and the power output set is in transmission connection to the first transmission shaft and the second transmission shaft.

Herein, since the transmission shaft is nonrotatable relative to the drum unit, and the motor output shaft is rotatable relative to the drum unit, rotation speeds and directions of the motor output shaft and the transmission shaft may be different. Therefore, directions and/or sizes of output speeds and/or output torque that may be output by the power output set or the anti-torque power set connected to the motor output shaft and the transmission shaft respectively may be different.

Advantageously, both the battery pack and the power motor may be arranged inside the drum unit, which may facilitate increase in the weight of the drum unit, so as to make the drum unit provide a greater anti-torque effect. It is also advantageous that both the power output set and the anti-torque power set may be arranged outside the two drum units, which may make an internal structure of the drum units simpler, and is beneficial to stability maintaining of the self-balancing power system.

Advantageously, a position relation between the first drum unit 1300 and the second drum unit 1400 may be unlimited. For example, the first drum unit 1300 and the second drum unit 1400 may be arranged in a vertical direction or a horizontal direction, and such a symmetrical structure may be conducive to stability maintaining of the entire self-balancing power system when the two drum units rotate respectively. It is also advantageous that the self-balancing power system 1000 may further include other drum units, for example, a third drum unit or a fourth drum unit (not shown herein). Such additional drum units may cooperate with the first drum unit 1300 and the second drum unit 1400, to perform the functions of the power output set and the anti-torque power set.

FIG. 2 illustratively shows a power output set 1100A of a self-balancing power system 1000 according to an embodiment of the present disclosure and an anti-torque power set 1200A according to an embodiment of the present disclosure.

As an instance, the power output set 1100A may include a first bevel gear 1110*a*, a second bevel gear 1120*a*, a third bevel gear 1130*a*, a fourth bevel gear 1140*a*, a fifth bevel gear 1150*a*, a sixth bevel gear 1160*a*, and a seventh bevel gear 1170*a*. Herein, the first bevel gear 1110*a* and the sixth bevel gear 1160*a* are connected to the first motor output shaft 1710 and the second motor output shaft 1810 in a relatively nonrotatable manner respectively, so as to implement transmission between the motor output shaft and the power output set. In this case, rotation speeds and directions of the first bevel gear 1110*a* and the sixth bevel gear 1160*a* are the same as those of the first motor output shaft 1710 and the second motor output shaft 1810 respectively. The second bevel gear 1120*a* and the seventh bevel gear 1170*a* mesh with the first bevel gear 1110*a* and the sixth bevel gear 1160*a* in a transmission connection manner respectively. In this case, the first bevel gear 1110*a* and the sixth bevel gear 1160*a* may be used as driving wheels, and the second bevel gear 1120*a* and the seventh bevel gear 1170*a* may be used as driven wheels. The third bevel gear 1130*a* and the fifth bevel gear 1150*a* are fixedly and coaxially connected to the second bevel gear 1120*a* and the seventh bevel gear 1170*a* respectively, such that a rotation speed and direction of the third bevel gear 1130*a* are the same as a rotation speed and direction of the second bevel gear 1120*a*, and a rotation speed and direction of the fifth bevel gear 1150*a* are also the same as a rotation speed and direction of the seventh bevel gear 1170*a*. The fourth bevel gear 1140*a* is arranged between the third bevel gear 1130*a* and the fifth bevel gear 1150*a*, and may mesh with the third bevel gear and the fifth bevel gear simultaneously. In this case, when the third bevel gear 1130*a* and the fifth bevel gear 1150*a* have the rotation speeds with a same size and in a same direction (that is, when torque output by the first motor output shaft and the second motor output shaft has a same size and a same direction), the fourth bevel gear 1140*a* is locked and cannot rotate, and the self-balancing power system 1000 outputs no power in this case.

As an instance, the anti-torque power set 1200A may include, for example, a first straight gear 1210*a*, a second straight gear 1220*a*, and a third straight gear 1230*a* having the same number of teeth. Herein, the first straight gear 1210*a* and the second straight gear 1220*a* are fixedly connected to the first transmission shaft 1310 and the second transmission shaft 1410 in a relatively nonrotatable manner respectively, so as to realize transmission between the transmission shaft and the anti-torque power set. In this case, the rotation speed and direction of the first straight gear 1210*a* and the second straight gear 1220*a* are the same as those of the first transmission shaft 1310 and the second transmission shaft 1410, respectively. The third straight gear 1230*a* can mesh with the first straight gear 1210*a* and the second straight gear 1220*a* simultaneously. In this case, when the first straight gear 1210*a* and the second straight gear 1220*a* have the rotation speeds with a same size in opposite directions (that is, when torque output by the first transmission shaft and the second transmission shaft has a same size in opposite directions), the third straight gear 1230*a* is locked and cannot rotate, and the self-balancing power system 1000 outputs no power in this case. Although the configuration of straight gears is shown herein, it should be understood that the structures or configuration of these gears need not necessarily be such. For example, the first straight gear 1210*a*, the second straight gear 1220*a*, and the third straight gear 1230*a* in this instance may also be replaced with bevel gears respectively, as long as they can use the same or similar transmission connections to achieve the same or similar transmission or locking effect.

Advantageously, due to the limitation of the combined action of the power output set and the anti-torque power set, a part of the output torque of the first power motor and the second power motor can be used for the output of the first motor output shaft and the second motor output shaft, and another part can be used for the output of the first transmission shaft and the second transmission shaft. For example, under the condition that the torque output by the first power motor and the second power motor has the same direction and size, the power output set 1100 is locked and outputs no power. In this case, all the torque output by the first power motor and the second power motor is used for the anti-torque power set 1200, to make the anti-torque power set output anti-torque. Under the condition that the torque output by the first power motor and the second power motor has the same size in opposite directions, the anti-torque power set 1200 is locked and outputs no anti-torque. In this case, all the torque output by the first power motor and the second power motor is used for the power output set 1100, to make the power output set output power. Under the condition that the torque output by the first power motor and the second power motor has different sizes, part of the torque output is used for the power output set to output power, and part of the torque output is used for the anti-torque power set to output anti-torque.

With reference to the embodiment shown in FIG. 2, the mode of cooperation between the power output set 1100 and the anti-torque power set 1200 and a working principle are discussed in different cases.

Under the condition that the first power motor and the second power motor provide torque with a same size in a same direction, on the one hand, the first motor output shaft and the second motor output shaft may have a tendency to provide torque with the same size in the same direction. In this case, the first bevel gear 1110*a* and the sixth bevel gear 1160*a* with the same number of teeth have rotation motion tendencies at a same speed in the same direction. Therefore, the third bevel gear 1130*a* and the fifth bevel gear 1150*a* with the same number of teeth have rotation motion tendencies at a same speed in a same direction, and then the fourth bevel gear 1140*a* receives driving forces with a same size in a same direction at upper and lower meshing positions, such that the fourth bevel gear 1140*a* is locked and does not rotate. In this case, all gears of the entire power output set are blocked and cannot rotate. Thus, practically, neither the first motor output shaft 1710 nor the second motor output shaft 1810 rotates and provides output torque to the outside. On the other hand, for example, since the first motor housing and the second motor housing are rotatable relative to the first motor output shaft and the second motor output shaft respectively, the output torque of the first motor housing and the second motor housing may be configured to rotate the first motor housing and the second motor housing, so as to rotate the first drum unit and the second drum unit fixedly connected to the first motor housing and the second motor housing, such that all the output torque of the first motor housing and the second motor can be used for output of the anti-torque power set. In this case, at the anti-torque power set 1200A, for example, the first straight gear 1210*a* and the second straight gear 1220*a* with the same number of teeth have motion tendencies at a same speed in a same direction, such that the third straight gear 1230*a* connected to the first straight gear and the second straight gear receives driving forces with a same size in opposite directions at the upper and lower meshing positions, and in this case, the third straight gear 1230a can rotate. In this case, by the combined action of the power output set and the anti-torque power set, an operating state in which the anti-torque power set 1200A can output anti-torque while the power output set 1100A of the self-balancing power system outputs no power can be realized, which can be applied, for example, to a case where balance control (for example, overturn correction) needs to be performed on a self-balancing vehicle in a stationary state, so as to maintain the balance without overturning.

Under the condition that the first power motor and the second power motor provide torque with a same size in opposite directions, on the one hand, the first motor output shaft and the second motor output shaft may have a tendency to provide torque with the same size in opposite directions. In this case, the first bevel gear 1110a and the sixth bevel gear 1160a with the same number of teeth may have rotation motion tendencies at a same speed in opposite directions. Therefore, the third bevel gear 1130a and the fifth bevel gear 1150a with the same number of teeth may have rotation motion tendencies at a same speed in opposite directions, and then the fourth bevel gear 1140a receives driving forces with a same size in opposite directions at upper and lower meshing positions, such that the fourth bevel gear 1140a can rotate. In this case, all the torque provided by the first power motor and the second power motor can be configured to make the first motor output shaft 1710 and the second motor output shaft 1810 output torque with a same size in opposite directions. On the other hand, for example, since the first motor housing and the second motor housing are rotatable relative to the first motor output shaft and the second motor output shaft respectively, neither the first motor housing nor the second motor housing (and thus neither the first transmission shaft nor the second transmission shaft) rotate or output torque. In this case, by the combined action of the power output set and the anti-torque power set, an operating state in which the anti-torque power set 1200A outputs no anti-torque while the power output set 1100A of the self-balancing power system outputs power can be realized, which can be applied, for example, to a case where the self-balancing vehicle is in a motion state without actively controlling its balance or correcting its overturning state.

Under the condition that the first power motor and the second power motor provide torque with different sizes (in this time, directions may be the same or not), the first motor output shaft and the second motor output shaft may have a tendency to provide torque with different sizes (in this time, directions may be the same or not). In this case, the first bevel gear 1110a and the sixth bevel gear 1160a with the same number of teeth have rotation motion tendencies at different speeds, and then the third bevel gear 1130a and the fifth bevel gear 1150a with the same number of teeth also have rotation motion tendencies at different speeds, such that the fourth bevel gear 1140a receives driving forces with different sizes at upper and lower meshing positions. Therefore, the fourth bevel gear 1140a can rotate by means of a difference (when the two forces are in the same direction) or a sum (when the two forces are in opposite directions) of the two forces. In this case, due to the structural configuration of the power output set, the first bevel gear and the sixth bevel gear can only rotate at a same speed in opposite directions actually, and accordingly, the first motor output shaft and the second motor output shaft can only provide torque with a same size in opposite directions actually. Therefore, in this case, only part of the torque provided by the first power motor and the second power motor is actually applied to the motor output shaft due to the limitation of a gear structure, and the other part is applied to the anti-torque power set, to rotate the transmission shaft (since the first motor housing and the second motor housing are rotatable relative to the first motor output shaft and the second motor output shaft respectively, the first motor housing and the second motor housing, and the first transmission shaft and the second transmission shaft can also rotate and output torque). Due to the structural configuration of the anti-torque power set, in fact, the first transmission shaft and the second transmission shaft eventually reach a state of providing anti-torque with a same size in a same direction. In this case, by the combined action of the power output set and the anti-torque power set, an operating state in which the anti-torque power set 1200A also outputs anti-torque while the power output set 1100A of the self-balancing power system outputs power can be realized, and can be applied, for example, to a case where the self-balancing vehicle is actively controlled such that it does not overturn in a motion state.

Figure 3:
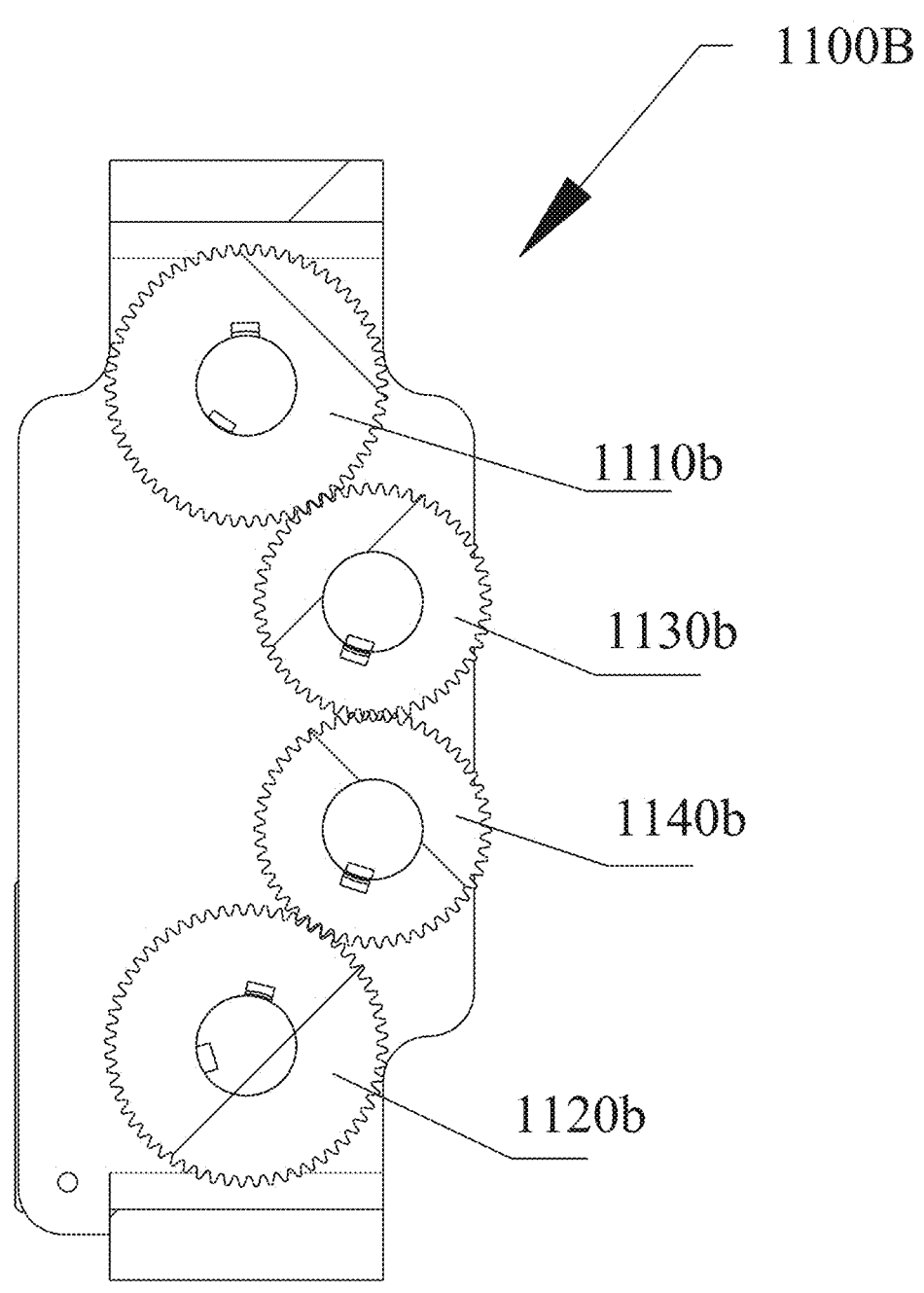
FIG. 3 is a schematic diagram of a power output set of a self-balancing power system according to another embodiment of the present disclosure.

FIG. 3 shows a power output set 1100B of a self-balancing power system according to another embodiment of the present disclosure. In the embodiment, the power output set 1100B may include a first straight gear 1110b, a second straight gear 1120b, a third straight gear 1130b and a fourth straight gear 1140b. Herein, for example, the first straight gear 1110b and the second straight gear 1120b with the same number of teeth are connected to the first motor output shaft 1710 and the second motor output shaft 1810 in a relatively nonrotatable manner respectively, so as to realize transmission between the motor output shaft and the power output set, for example, the third straight gear 1130b and the fourth straight gear 1140b with the same number of teeth mesh with the first straight gear 1110b and the second straight gear 1120b for transmission respectively. Further, the third straight gear 1130b and the fourth straight gear 1140b mesh for transmission. Although the straight gears are shown herein, it should be understood that the configuration of these gears need not limited. For example, the straight gears in this instance may also be replaced with bevel gears respectively, as long as they can use the same or similar transmission connections to achieve the same or similar transmission or locking effect. A working principle of the power output set 1100B is similar to that of the power output set 1100A described above, which will not be described herein. It should be understood that the power output set should have similar working principles and/or functions as described above.

Figure 4:
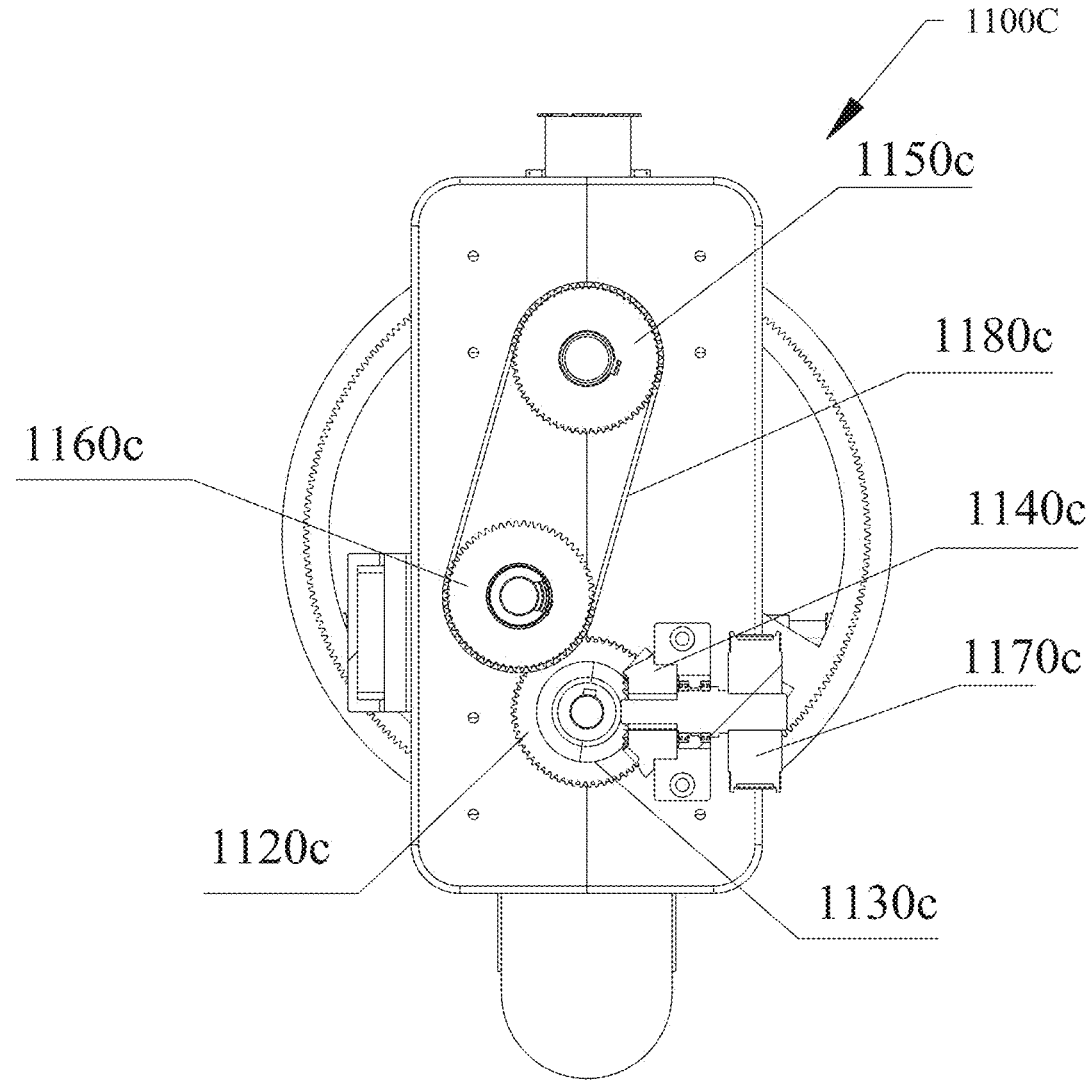
FIGS. 4 and 5 are schematic diagrams of a power output set of a self-balancing power system according to another embodiment of the present disclosure.
Figure 5:
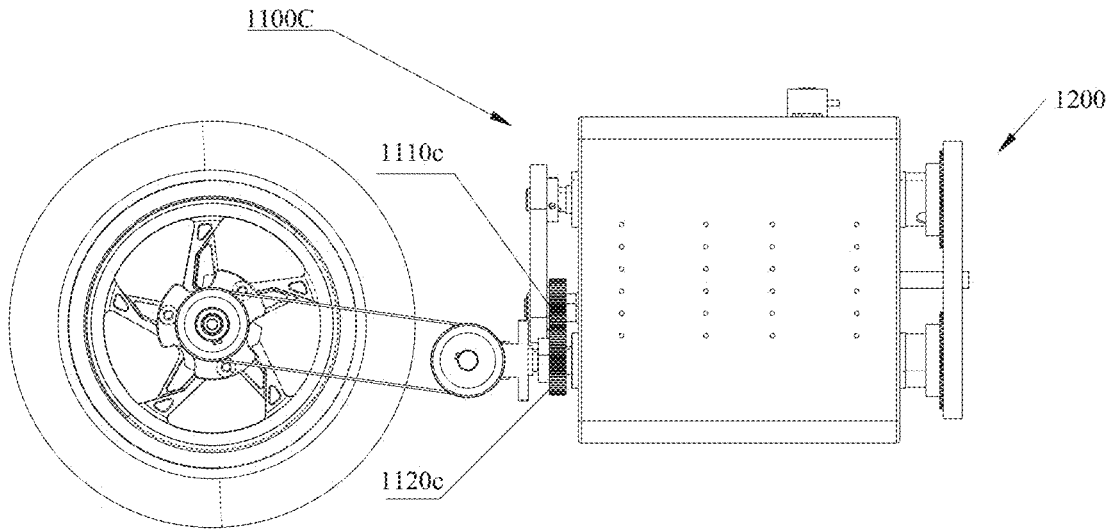

FIGS. 4 and 5 show a power output set 1100C of a self-balancing power system 1000 according to another embodiment of the present disclosure. In the embodiment, the power output set 1100C may include a first straight gear 1110c, a second straight gear 1120c, a first bevel gear 1130c, a second bevel gear 1140c, a first belt pulley 1150c, a second belt pulley 1160c, a third belt pulley 1170c and a synchronous belt 1180c. Herein, the first belt pulley 1150c and the second straight gear 1120c may be connected to the first motor output shaft 1710 and the second motor output shaft 1810 in a relatively nonrotatable manner respectively, so as to implement transmission between the motor output shaft and the power output set. Further, the second straight gear 1120c and the first straight gear 1110c mesh with each other, the first straight gear 1110c is coaxially connected to the second belt pulley 1160c in a relatively nonrotatable manner, and the synchronous belt 1180c and the first belt pulley 1150c and the second belt pulley 1160c are in synchronous transmission, preferably meshing transmission. Moreover, the first bevel gear 1130c is coaxially connected to the second straight gear 1120c in a relatively nonrotatable manner. The second bevel gear 1140c meshes with the first bevel gear 1130c for transmission. The third belt pulley 1170c is coaxially connected to the second bevel gear 1140c in a relatively nonrotatable manner. The third belt pulley 1170c meshes with the synchronous belt for rotation. Herein, the first bevel gear 1130c, the second bevel gear 1140c, and the third belt pulley 1170c may be configured to implement transmission with the second straight gear 1120c to output power, which may not limit that the first motor output shaft and the second motor output shaft provide torque.

Figure 6:
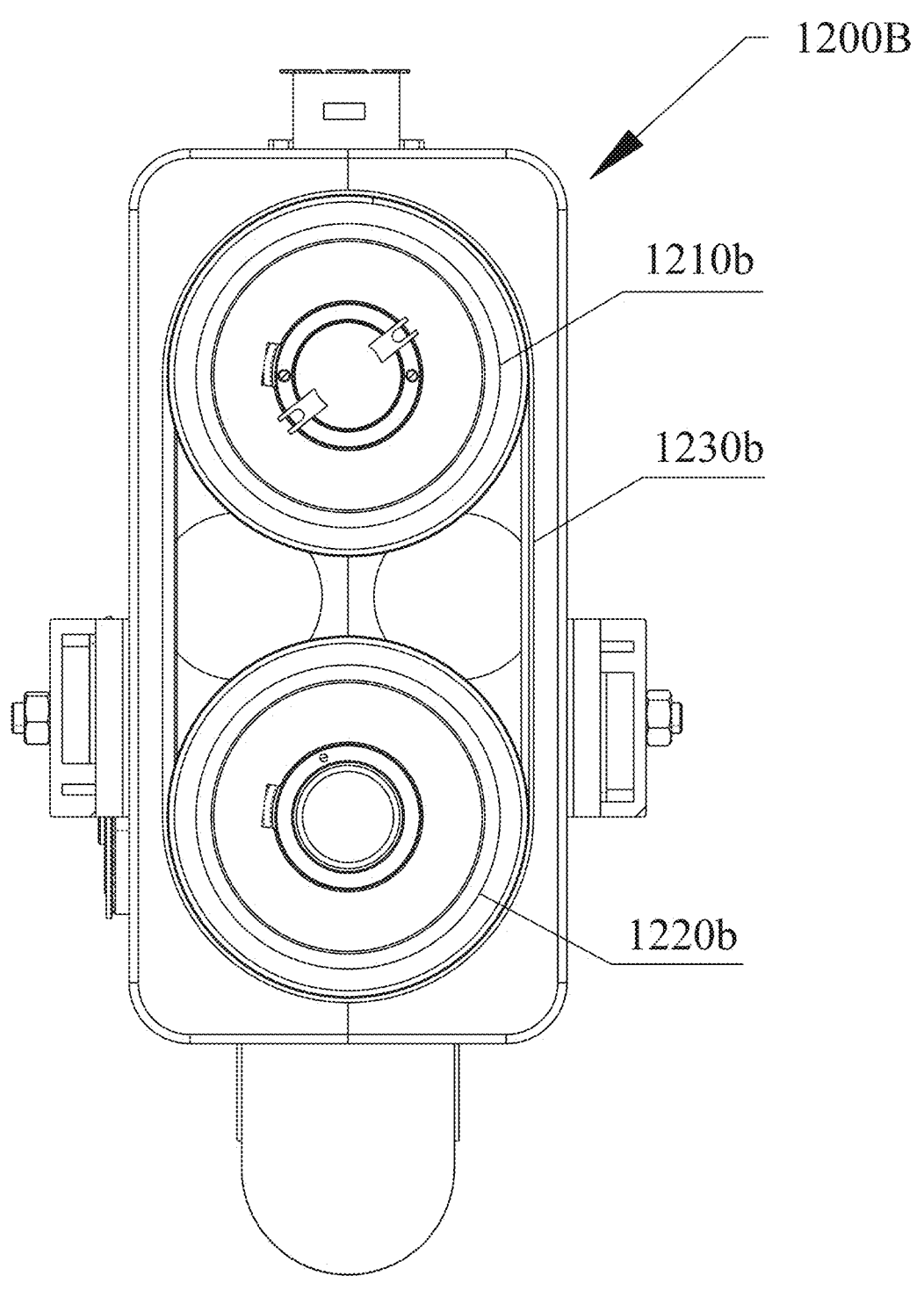
FIG. 6 is a schematic diagram of an anti-torque power set of a self-balancing power system according to another embodiment of the present disclosure.

FIG. 6 shows an anti-torque power set 1200B of a self-balancing power system according to another embodiment of the present disclosure. In the embodiment, the anti-torque power set 1200B may include a first belt pulley 1210b, a second belt pulley 1220b and a synchronous belt 1230b. Herein, the first belt pulley 1210b and the second belt pulley 1220b are connected to the first transmission shaft 1310 and the second transmission shaft 1410 in a relatively nonrotatable manner respectively, so as to realize transmission between the transmission shaft and the anti-torque power set. The synchronous belt meshes with the first belt pulley 1210b and the second belt pulley 1220b at outer sides of the first belt pulley 1210b and the second belt pulley 1220b, so as to realize synchronous rotation. Similar to the working principle of the anti-torque power set 1200A described above, the anti-torque power set 1200B may be configured to allow the first transmission shaft and the second transmission shaft only to provide torque with a same size in a same direction actually.

Figure 7:
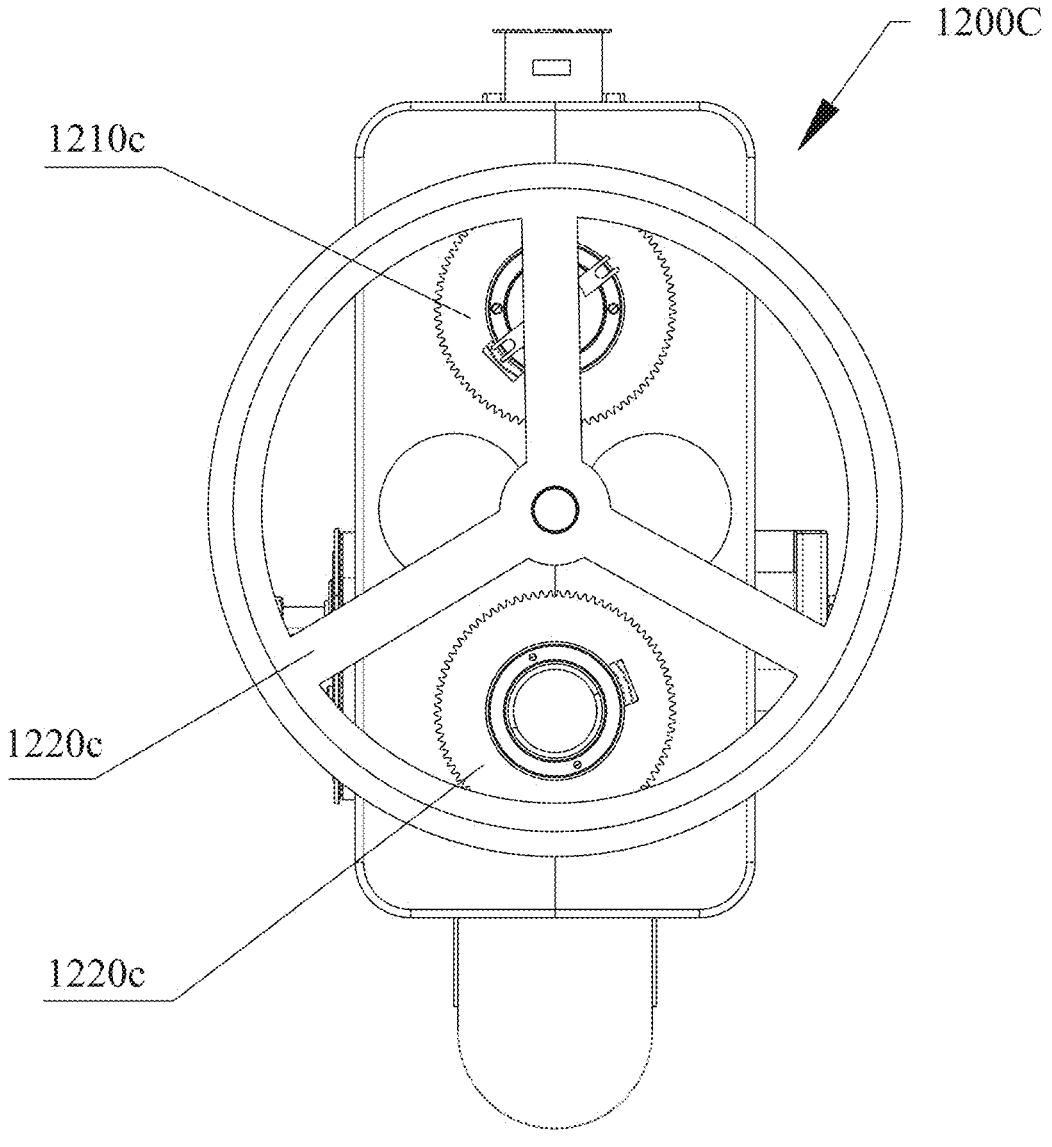
FIG. 7 is a schematic diagram of an anti-torque power set of a self-balancing power system according to another embodiment of the present disclosure.

FIG. 7 shows an anti-torque power set 1200C of a self-balancing power system 1000 according to another embodiment of the present disclosure. In the embodiment, the anti-torque power set 1200C may include a first straight gear 1210c, a second straight gear 1220c and a third straight internal gear 1230c. Herein, the first straight gear 1210c and the second straight gear 1220c are connected to the first transmission shaft 1310 and the second transmission shaft 1410 in a relatively nonrotatable manner respectively, so as to realize transmission between the transmission shaft and the anti-torque power set. An inner side of the third straight gear 1230c meshes with the first straight gear 1210c and the second straight gear 1220c separately. Similar to the working principle of the anti-torque power set 1200A and 1200B described above, the anti-torque power set 1200C may be configured to allow the first transmission shaft and the second transmission shaft only to provide torque with a same size in a same direction actually.

Herein, it should be understood that although the constitution of the power output sets 1100A, 1100B, 1100C and the anti-torque power sets 1200A, 1200B, 1200C has been explained above with the aid of the drawings, the power output set and the anti-torque power set according to the present disclosure are not limited to these specific structures. The power output set 1100 may be any device for making the first motor output shaft and the second motor output shaft only provide torque and/or rotation speed with a same size in opposite directions actually, and the anti-torque power set 1200 may be any device for making the first transmission shaft and the second transmission shaft to only provide torque and/or rotation speed with a same size in a same direction actually. Furthermore, the specific embodiments of these power output sets and anti-torque power sets may be substituted and/or combined arbitrarily and are not limited to those listed in the drawings.

Figure 8:
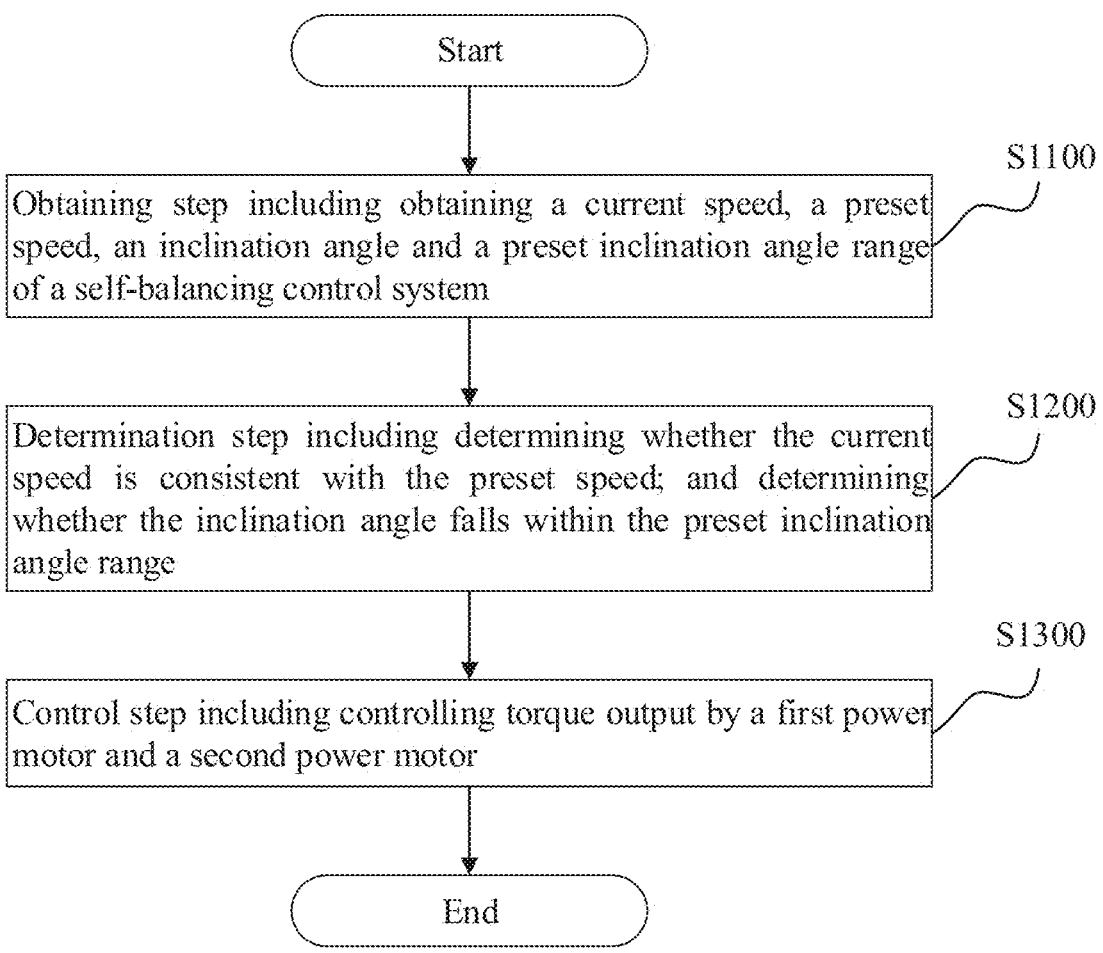
FIG. 8 is an illustrative flowchart of a self-balancing control method according to an embodiment of the present disclosure.

FIG. 8 shows a flowchart of a self-balancing control method S1000 according to an embodiment of the present disclosure. The self-balancing control method S1000 may be configured, for example, to control the self-balancing power system 1000 to operate according to the above working principles. As an instance, the self-balancing control method S1000 may include an obtaining step S1100, a determination step S1200, and a control step S1300.

The obtaining step S1100 may include obtain a current speed, a preset speed, an inclination angle and a preset inclination angle range of the self-balancing power system. Herein, the "current speed" may be a current (for example, along its plane of motion) actual speed of motion of the self-balancing power system, and may be obtained by a sensor (for example, an acceleration sensor or a speed sensor) mounted on the system. The "preset speed" may be a (for example, current or upcoming) desired speed of motion expected or desired by the system, and may be input by a user in real time or in advance or obtained from information stored in the system in advance. The "inclination angle" may be a current angle between a central axis plane and a vertical plane of the self-balancing power system, and may be obtained by a sensor (for example, an acceleration sensor or an angle sensor) mounted on the system. The "preset inclination angle range" may be an angle range in which the current system is expected to be located, for example, for determining whether the system currently reaches a state of overturning and/or whether self-balancing control needs to be activated.

The determination step S1200 may include determine whether the current speed of the system is consistent with the preset speed. In case that the current speed is consistent with the preset speed, this may, for example, indicate that no power or resistance (for example, to modulate a speed of the system) is required from system output. In case that the current speed of the system is inconsistent with the preset speed, this may, for example, indicate that power or resistance is required from system output, to further, for example, modulate the speed of the system. Furthermore, the determination step S1200 may further include determine whether a current inclination angle of the system falls within the preset inclination angle range, or whether the current inclination angle is less than or equal to a preset inclination angle threshold. In case that the current inclination angle falls within the preset inclination angle range, this may, for example, indicate that the system is not currently in an overturning state or that no inclination angle correction (that is, overturning attitude correction to bring the system back to equilibrium) is required by the system. In case that the current inclination angle does not falls within the preset inclination angle range, this may, for example, indicate that the system is currently in an overturning state or that inclination angle correction is required by the system. Herein, the preset inclination angle may be, for example, any fixed value in 0°-20°, and 0°-10°, or may be 0°, such that the overturning attitude of the self-balancing power system can be corrected in time, to maintain stability as much as possible. As an instance, when the preset inclination angle range is 0°-10°, in case that the current inclination angle is measured to be greater than 10°, it indicates that the current inclination angle is does not fall within the preset inclination angle range, and the system needs inclination angle (or overturning attitude) correction. In case that the current inclination angle is measured to be less than or equal to 10°, it indicates that the current inclination angle falls within the preset inclination angle range, and the system does not need inclination angle (or overturning attitude) correction. As another instance, when the preset inclination angle range is set to be 0° (in this case, the preset inclination angle range is a preset angle threshold), the step of determining the inclination angle includes determine whether the current inclination angle of the system (that is, the angle between the central axis plane of the system and the vertical plane) is 0°, that is, whether the central axis plane of the system is just perpendicular to a plane on which the system is located, so as to determine whether the system needs inclination angle correction currently.

Figure 9:
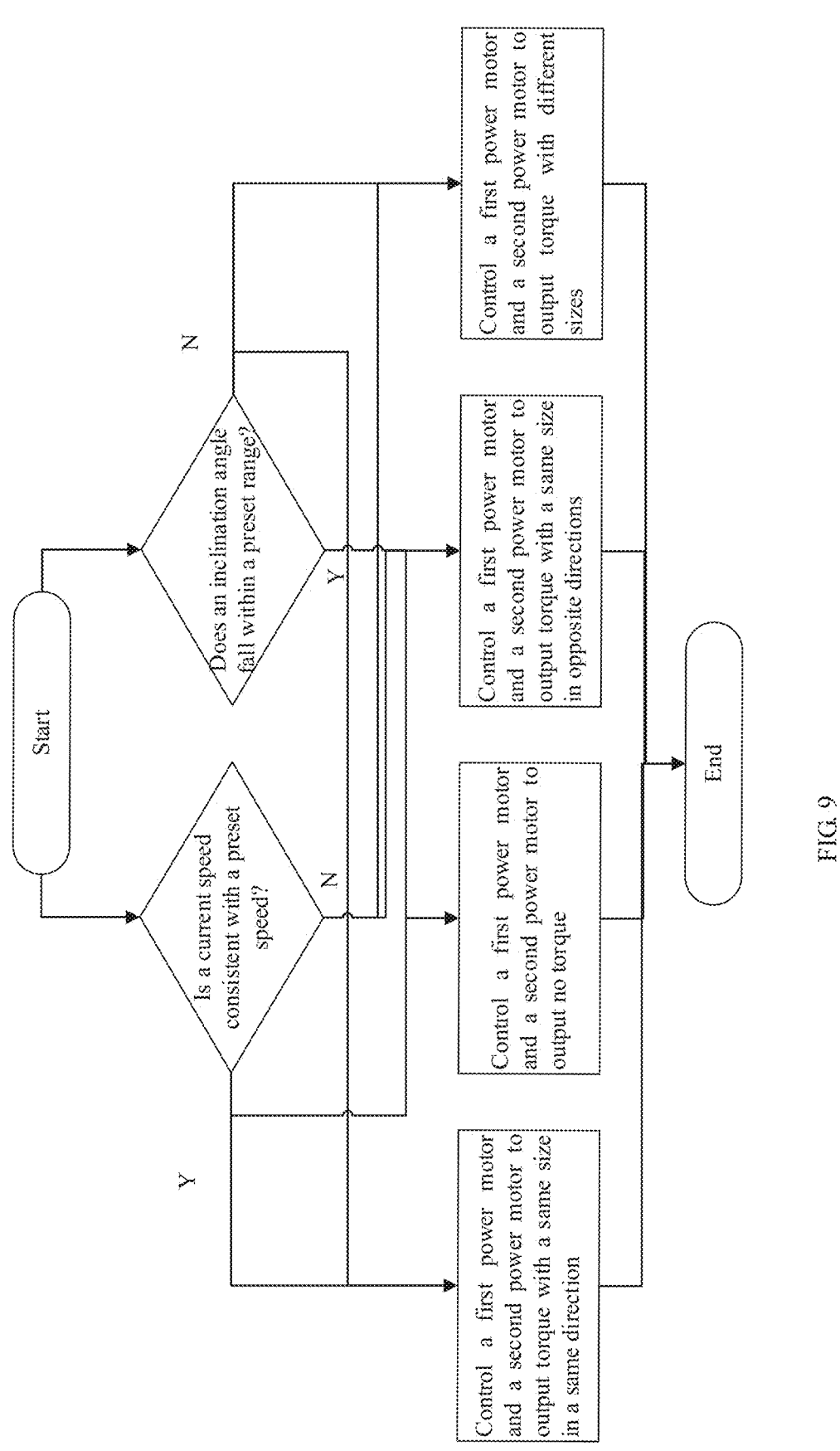
FIG. 9 is an illustrative flowchart of some steps of a self-balancing control method according to an embodiment of the present disclosure.

The control step S1300 may include control torque output by a first power motor and a second power motor according to a determination result. As shown in FIG. 9, the control step may make, for example, four different output control modes according to, for example, different determination results output by the determination step.

Under the condition that the current speed of the system is determined to be consistent with the preset speed and the current inclination angle of the system does not fall within the preset inclination angle range (in other words, in this case, the speed of the system does not need to change, but the system needs overturning attitude correction), the control step S1300 controls the first power motor and the second power motor to output torque with a same size in the same direction (for example, by controlling output power of the first power motor and the second power motor to be the same and rotation directions of a first motor output shaft and a second motor output shaft to be the same). In this case, the power output set may output no power, and the anti-torque power set may output anti-torque.

Under the condition that the current speed of the system is determined to be consistent with the preset speed and the current inclination angle of the system falls within the preset inclination angle range (in other words, in this case, the speed of the system does need to change, and the system does not need overturning attitude correction), the control step S1300 controls the first power motor and the second power motor to output no torque (for example, by controlling output power of the first power motor and the second power motor to be zero). In this case, the power output set may output no power, and the anti-torque power set may output no anti-torque.

Under the condition that the current speed of the system is determined to be inconsistent with the preset speed and the current inclination angle of the system falls within the preset inclination angle range (in other words, in this case, the speed of the system needs to change, but the system needs no overturning attitude correction), the control step S1300 controls the first power motor and the second power motor to output torque with a same size in opposite directions (for example, by controlling output power of the first power motor and the second power motor to be the same and rotation directions of a first motor output shaft and a second motor output shaft to be opposite). In this case, the power output set may output power, and the anti-torque power set may output no anti-torque.

Under the condition that the current speed of the system is determined to be inconsistent with the preset speed and the current inclination angle of the system does not fall within the preset inclination angle range (in other words, in this case, the speed of the system needs to change, and the system needs overturning attitude correction), the control step S1300 control the first power motor and the second power motor to output torque (in this case, the directions of the torque may be the same or not) with different sizes (for example, by controlling output power of the first power motor and the second power motor to be different), so as to realize that the power output set outputs power, and the anti-torque power set outputs anti-torque.

The self-balancing control method S1000 may be implemented, for example, by a self-balancing control system (not shown in the drawings). The self-balancing control system may include an obtaining module for performing the obtaining step S1100, a processing module or a determination module for performing the determination step S1200, and a control module for performing the control step S1300. In a preferred embodiment, the obtaining module may, for example, include an acceleration sensor and/or a speed sensor for measuring the current acceleration and/or the current speed of the system, so as to further obtain values of the current speed and/or the inclination angle, and the preset speed and the preset inclination angle may be pre-stored in the self-balancing control system and/or obtained from a controller of the self-balancing control system. The processing module may, for example, include a processing unit configured to compare and determine the obtained current speed and/or the inclination angle with the preset speed and/or the preset inclination angle. The control module may, for example, include a motor controller configured to control directions and/or sizes of output power and/or output torque of a power motor.

Figure 10:
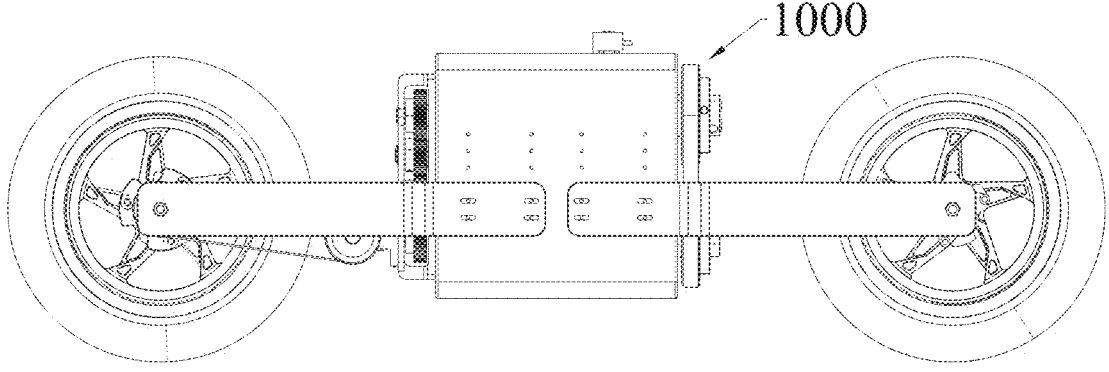
FIG. 10 is a schematic diagram of a self-balancing vehicle according to an embodiment of the present disclosure.

FIG. 10 shows a self-balancing vehicle 3000 according to an embodiment of the present disclosure. The self-balancing vehicle may include the above self-balancing power system 1000 and/or the self-balancing control system, and/or apply the above self-balancing control method. In the case of application to a self-balancing vehicle, the power output set in the self-balancing power system may be configured to provide power for a forward/reverse driving state of the self-balancing vehicle, and the anti-torque power set in the self-balancing power system may be configured to provide anti-torque for correcting an overturning attitude of the self-balancing vehicle. The self-balancing vehicle can be a two-wheeled vehicle, preferably a motorcycle, particularly preferably a purely electric driven motorcycle or a hybrid oil and electricity driven motorcycle.

The present disclosure achieves the self-balancing power system, the self-balancing control method, the self-balancing control system, and the self-balancing vehicle through the following implementation solutions. By arranging some structures of the self-balancing power system outside the main body of the system and arranging different power motors in different housing, the effects of improving the space utilization rate and endurance can be realized at least, and the stability and heat dissipation effect of the self-balancing power system can be improved.

A first aspect: a self-balancing power system is provided. The self-balancing power system includes a first drum unit, a second drum unit, a first battery pack, a second battery pack, a first power motor, a second power motor, a power output set and an anti-torque power set, where the power output set and the anti-torque power set are in transmission connection to the first drum unit and the second drum unit respectively from two sides of the first drum unit and the second drum unit, the power output set is configured to provide output power of the self-balancing power system, and the anti-torque power set is configured to provide anti-torque of the self-balancing power system.

A second aspect: according to the self-balancing power system in the second aspect, the first power motor includes a first motor housing and a first motor output shaft, where the first motor housing is rotatable relative to the first motor output shaft, and the first motor housing is nonrotatable relative to the first drum unit; and the second power motor includes a second motor housing and a second motor output shaft, where the second motor housing is rotatable relative to the second motor output shaft, and the second motor housing is nonrotatable relative to the second drum unit.

A third aspect, according to the self-balancing power system in the second aspect, the first battery pack is fixed to the first drum unit, and the second battery pack is fixed to the second drum unit.

A fourth aspect: according to the self-balancing power system in the second aspect, the first power motor housing is connected to the first drum unit in a nonrotatable manner, and the second power motor housing is connected to the second drum unit in a nonrotatable manner.

A fifth aspect: according to the self-balancing power system in the second aspect, the first drum unit and the second drum unit include a first transmission shaft and a second transmission shaft respectively, where the first transmission shaft is nonrotatable relative to the first drum unit, and the second transmission shaft is nonrotatable relative to the second drum unit.

A sixth aspect: according to the self-balancing power system in the fifth aspect, the power output set is in transmission connection to the first motor output shaft and the second motor output shaft separately, and the anti-torque power set is in transmission connection to the first transmission shaft and the second transmission shaft separately.

A seventh aspect: according to the self-balancing power system in the fifth aspect, the anti-torque power set is in transmission connection to the first motor output shaft and the second motor output shaft separately, and the power output set is in transmission connection to the first transmission shaft and the second transmission shaft separately.

An eighth aspect: according to the self-balancing power system in any one of the first aspect to the seventh aspect, the self-balancing power system is configured to make the power output set output no power and the anti-torque power set output anti-torque under the condition that the first power motor and the second power motor output torque in a same direction and with a same size; alternatively, make the power output set output power and the anti-torque power set output no anti-torque under the condition that the first power motor and the second power motor output torque in opposite directions and with a same size; and alternatively, make the power output set output power and the anti-torque power set output anti-torque under the condition that the first power motor and the second power motor output torque with different sizes.

A ninth aspect: according to the self-balancing power system in the eighth aspect, the first drum unit and the second drum unit are arranged in parallel in a vertical direction or a horizontal direction.

A tenth aspect: according to the self-balancing power system in the eighth aspect, the first battery pack and the first power motor are fixed inside the first drum unit, and the second battery pack and the second power motor are fixed inside the second drum unit.

An eleventh aspect: according to the self-balancing power system in the eighth aspect, the power output set includes a first bevel gear, a second bevel gear, a third bevel gear, a fourth bevel gear, a fifth bevel gear, a sixth bevel gear and a seventh bevel gear, where the first bevel gear and the sixth bevel gear are connected to the first motor output shaft and the second motor output shaft in a relatively nonrotatable manner respectively; the second bevel gear and the seventh bevel gear are in transmission connection to the first bevel gear and the sixth bevel gear respectively; the third bevel gear and the fifth bevel gear are coaxially connected to the second bevel gear and the seventh bevel gear in a relatively nonrotatable manner respectively; and the fourth bevel gear is in transmission connection to the third bevel gear and the fifth bevel gear separately.

A twelfth aspect: according to the self-balancing power system in the eighth aspect, the power output set includes a first straight gear, a second straight gear, a third straight gear and a fourth straight gear, where the first straight gear and the second straight gear are connected to the first motor output shaft and the second motor output shaft in a relatively nonrotatable manner respectively, the third straight gear and the fourth straight gear are in transmission connection to the first straight gear and the second straight gear respectively, and the third straight gear is in transmission connection to the fourth straight gear.

A thirteenth aspect: according to the self-balancing power system in the eighth aspect, the power output set includes a first straight gear, a second straight gear, a first bevel gear, a second bevel gear, a first belt pulley, a second belt pulley, a third belt pulley and a synchronous belt, where the first belt pulley and the second straight gear are connected to the first motor output shaft and the second motor output shaft in a relatively nonrotatable manner respectively, the second straight gear is in transmission connection to the first straight gear, the second belt pulley is coaxially connected to the first straight gear in a relatively nonrotatable manner, the synchronous belt is in transmission connection to the first belt pulley and the second belt pulley separately, the second straight gear is coaxially connected to the first bevel gear in a relatively nonrotatable manner, the second bevel gear is in transmission connection to the first bevel gear, and the third belt pulley is coaxially connected to the second bevel gear in a relatively nonrotatable manner.

A fourteenth aspect: according to the self-balancing power system in the eighth aspect, the anti-torque power set includes a first straight gear, a second straight gear and a third straight gear, where the first straight gear and the second straight gear are connected to the first transmission shaft and the second transmission shaft in a relatively nonrotatable manner respectively, and the third straight gear is in transmission connection to the first straight gear and the second straight gear separately.

A fifteenth aspect: according to the self-balancing power system in the eighth aspect, the anti-torque power set includes a first belt pulley, a second belt pulley and a synchronous belt, where the first belt pulley and the second belt pulley are connected to the first transmission shaft and the second transmission shaft in a relatively nonrotatable manner respectively; and the synchronous belt is in transmission connection to the first belt pulley and the second belt pulley separately.

A sixteenth aspect: according to the self-balancing power system in the eighth aspect, the anti-torque power set includes a first straight gear, a second straight gear and a third straight internal gear, where the first straight gear and the second straight gear are connected to the first transmission shaft and the second transmission shaft in a relatively nonrotatable manner respectively, and the third straight internal gear is in transmission connection to the first straight gear and the second straight gear separately.

A seventeenth aspect: a self-balancing control method is configured to control the self-balancing power system in any one of the first aspect to the sixteenth aspect. The self-balancing control method includes: an obtaining step including obtaining a current speed, a preset speed, an inclination angle and a preset inclination angle range of the self-balancing power system; a determination step including determining whether the current speed is consistent with the preset speed, and determining whether the inclination angle falls within the preset inclination angle range; and a control step including: controlling a first power motor and a second power motor to output torque in a same direction and with a same size when it is determined that the current speed is consistent with the preset speed and the inclination angle does not fall within the preset inclination angle range, and making a power output set output no power and the anti-torque power set output anti-torque; alternatively, controlling a first power motor and a second power motor to output no torque when it is determined that the current speed is consistent with the preset speed and the inclination angle falls within the preset inclination angle range, and making the power output set output no power and the anti-torque power set output no anti-torque; alternatively, controlling a first power motor and a second power motor to output torque in opposite directions and with a same size when it is determined that the current speed is inconsistent with the preset speed and the inclination angle falls within the preset inclination angle range, and making a power output set output power and the anti-torque power set output no anti-torque; and alternatively, controlling a first power motor and a second power motor to output torque with different sizes when it is determined that the current speed is inconsistent at the preset speed and the inclination angle does not fall within the preset inclination angle range, and making a power output set output power and the anti-torque power set output anti-torque.

An eighteenth aspect: according to the self-balancing control method in the seventeenth aspect, the controlling a first power motor and a second power motor to output torque in a same direction and with a same size includes controlling output power of the first power motor and the second power motor to be the same, and controlling rotation directions of a first motor output shaft and a second motor output shaft to be the same.

A nineteenth aspect: according to the self-balancing control method in the seventeenth aspect, the controlling a first power motor and a second power motor to output no torque includes controlling output power of the first power motor and the second power motor to be zero.

A twentieth aspect: according to the self-balancing control method in the seventeenth aspect, the controlling a first power motor and a second power motor to output torque in a same direction and with a same size includes controlling output power of the first power motor and the second power motor to be the same, and controlling rotation directions of a first motor output shaft and a second motor output shaft to be the same.

A twenty-first aspect: according to the self-balancing control method in the seventeenth aspect, the controlling a first power motor and a second power motor to output torque with different sizes includes controlling output power of the first power motor and the second power motor to be different.

A twenty-second aspect: according to the self-balancing control method in any one of the seventeenth aspect to the twenty-first aspect, an angle between a central axis plane and a vertical plane of the self-balancing power system is set as the inclination angle.

A twenty-third aspect: according to the self-balancing control method in any one of the seventeenth aspect to the twenty-first aspect, the inclination angle range is set to be 0°-10°, such that the inclination angle not falling within the preset inclination angle range includes the inclination angle being greater than 10°, and the inclination angle falling within the preset inclination angle range includes the inclination angle being less than or equal to 10°.

A twenty-fourth aspect: according to the self-balancing control method in any one of the seventeenth aspect to the twenty-first aspect, the inclination angle not falling within the preset inclination angle range includes the inclination angle being unequal to 0°, and the inclination angle falling within the preset inclination angle range includes the inclination angle being equal to 0°.

A twenty-fifth aspect: a self-balancing control system is configured to implement the self-balancing control method in any one of the seventeenth aspect to the twenty-fourth aspect. The self-balancing control system includes: an obtaining module configured to implement an obtaining step; a processing module configured to implement a determination step; and a control module configured to implement a control step.

A twenty-sixth aspect: according to the self-balancing control system in the twenty-fifth aspect, the obtaining module includes an acceleration sensor and/or a speed sensor, the processing module includes a processing unit, and/or the control module includes a motor controller.

A twenty-seventh aspect: according to the self-balancing control system in the twenty-sixth aspect, the acceleration sensor and/or the speed sensor is configured to measure or calculate a current speed and/or an inclination angle.

A twenty-eighth aspect: according to the self-balancing control method in the twenty-sixth aspect, a preset speed and a preset inclination angle range are pre-stored in the self-balancing control system, and/or obtained from a controller of the self-balancing control system.

A twenty-ninth aspect: a self-balancing vehicle is provided. The self-balancing vehicle includes the self-balancing power system in any one of the first aspect to the sixteenth aspect and/or the self-balancing control system in any one of the twenty-fifth aspect to the twenty-eighth aspect, and/or the self-balancing vehicle applies the self-balancing control method in any one of the seventeenth aspect to the twenty-fourth aspect.

A thirtieth aspect: according to the self-balancing vehicle in the twenty-ninth aspect, a power output set is configured to provide driving power for a forward or backward state of the self-balancing vehicle, and an anti-torque power set is configured to provide anti-torque for correcting an overturning attitude of the self-balancing vehicle.

A thirty-first aspect: according to the self-balancing vehicle in the twenty-ninth aspect or the thirtieth aspect, the self-balancing vehicle is a two-wheeled vehicle.

A thirty-second aspect: according to the self-balancing vehicle in the twenty-ninth aspect or the thirtieth aspect, the self-balancing vehicle is an electric motorcycle.

A thirty-third aspect: according to the self-balancing vehicle in the thirty-second aspect, the electric motorcycle is a purely electric driven motorcycle or a hybrid oil and electric driven motorcycle.

What are described above are merely being particular embodiments of the present disclosure, and are not intended to limit the scope of protection of the present disclosure, and any changes or substitutions that can readily occur to those skilled in the art within the scope of technology disclosed in the present disclosure should fall within the scope of protection of the present disclosure. Therefore, the scope of protection of the present disclosure shall be subject to the scope of protection of the claims.

What is claimed is:

1. A self-balancing power system, comprising:
a first drum unit, a second drum unit, a first battery pack, a second battery pack, a first power motor, a second power motor, a first power output set and a second power output set, wherein
the first power output set is in transmission connection to one side of the first drum unit and one side of the second drum unit respectively, and the second power output set is in transmission connection to another side of the first drum unit and another side of the second drum unit, respectively;
the first power output set is configured to provide a first power torque of the self-balancing power system, and the second power output set is configured to provide a second output torque of the self-balancing power system;
the first battery pack and the first power motor are fixed inside the first drum unit, and
the second battery pack and the second power motor are fixed inside the second drum unit.

2. The self-balancing power system according to claim 1, wherein
the first power motor comprises a first motor housing and a first motor output shaft, wherein the first motor housing is rotatable relative to the first motor output shaft, and the first motor housing is nonrotatable relative to the first drum unit; and
the second power motor comprises a second motor housing and a second motor output shaft, wherein the second motor housing is rotatable relative to the second motor output shaft, and the second motor housing is nonrotatable relative to the second drum unit.

3. The self-balancing power system according to claim 2, wherein
the first battery pack is fixed to the first drum unit, and the second battery pack is fixed to the second drum unit.

4. The self-balancing power system according to claim 2, wherein
the first motor housing is connected to the first drum unit in a nonrotatable manner, and the second motor housing is connected to the second drum unit in a nonrotatable manner.

5. The self-balancing power system according to claim 2, wherein
the first drum unit and the second drum unit comprise a first transmission shaft and a second transmission shaft respectively, wherein the first transmission shaft is nonrotatable relative to the first drum unit, and the second transmission shaft is nonrotatable relative to the second drum unit.

6. The self-balancing power system according to claim 5, wherein
the first power output set is in transmission connection to the first motor output shaft and the second motor output shaft separately, and the second power output set is in transmission connection to the first transmission shaft and the second transmission shaft separately.

7. The self-balancing power system according to claim 5, wherein
the second power output set is in transmission connection to the first motor output shaft and the second motor output shaft separately, and the first power output set is in transmission connection to the first transmission shaft and the second transmission shaft separately.

8. The self-balancing power system according to claim 1, wherein the self-balancing power system is configured to:
make the first power output set output no torque and the second power output set output the second output torque under a condition that the first motor and the second motor output torque in a same direction and with a same size; alternatively,
make the first power output set power the first output torque and the second power output set output no torque under a condition that the first motor and the second motor output torque in opposite directions and with a same size; and alternatively,
make the first power output set output the first output torque and the second power output set output the second output torque under a condition that the first motor and the second motor output torque with different sizes.

9. The self-balancing power system according to claim 8, wherein
the first drum unit and the second drum unit are arranged in parallel in a vertical direction or a horizontal direction.

10. The self-balancing power system according to claim 8, wherein
the first power output set comprises a first bevel gear, a second bevel gear, a third bevel gear, a fourth bevel gear, a fifth bevel gear, a sixth bevel gear and a seventh bevel gear, wherein
the first bevel gear and the sixth bevel gear are connected to the first motor output shaft and the second motor output shaft in a relatively nonrotatable manner respectively;
the second bevel gear and the seventh bevel gear are in transmission connection to the first bevel gear and the sixth bevel gear respectively;
the third bevel gear and the fifth bevel gear are coaxially connected to the second bevel gear and the seventh bevel gear in a relatively nonrotatable manner respectively; and
the fourth bevel gear is in transmission connection to the third bevel gear and the fifth bevel gear separately.

11. The self-balancing power system according to claim 8, wherein
the first power output set comprises a first straight gear, a second straight gear, a third straight gear and a fourth straight gear, wherein
the first straight gear and the second straight gear are connected to the first motor output shaft and the second motor output shaft in a relatively nonrotatable manner respectively, the third straight gear and the fourth straight gear are in transmission connection to the first straight gear and the second straight gear respectively, and the third straight gear is in transmission connection to the fourth straight gear.

12. The self-balancing power system according to claim 8, wherein the second power output set comprises a first straight gear, a second straight gear and a third straight gear, wherein the first straight gear and the second straight gear are connected to the first transmission shaft and the second transmission shaft in a relatively nonrotatable manner respectively, and the third straight gear is in transmission connection to the first straight gear and the second straight gear separately.

13. The self-balancing power system according to claim 8, wherein the second power output set comprises a first straight gear, a second straight gear and a third straight internal gear, wherein the first straight gear and the second straight gear are connected to the first transmission shaft and the second transmission shaft in a relatively nonrotatable manner respectively, and the third straight internal gear is in transmission connection to the first straight gear and the second straight gear separately.

14. A self-balancing vehicle, comprising the self-balancing power system according to claim 1.

15. The self-balancing vehicle according to claim 14, wherein the first power output set is configured to provide the first output torque for a forward or backward state of the self-balancing vehicle, and the second power output set is configured to provide the second output torque for correcting an overturning attitude of the self-balancing vehicle.

16. The self-balancing vehicle according to claim 14, wherein the self-balancing vehicle is a two-wheeled vehicle.

17. The self-balancing vehicle according to claim 14, wherein the self-balancing vehicle is an electric motorcycle.

18. The self-balancing vehicle according to claim 17, wherein the electric motorcycle is a pure electric driven motorcycle or a hybrid oil and electricity driven motorcycle.

19. A self-balancing power system, comprising:

a first drum unit, a second drum unit, a first battery pack, a second battery pack, a first power motor, a second power motor, a first power output set and a second power output set, wherein the first power output set is in transmission connection to one side of the first drum unit and one side of the second drum unit respectively, and the second power output set is in transmission connection to another side of the first drum unit and another side of the second drum unit, respectively;

the first power output set is configured to provide a first output torque of the self-balancing power system, and the second power output set is configured to provide a second output torque of the self-balancing power system;

wherein the self-balancing power system is configured to:

make the first power output set output no torque and the second power output set output the second output torque under a condition that the first power motor and the second power motor output torque in a same direction and with a same size; alternatively, make the first power output set output the first output torque and the second power output set output no torque under a condition that the first power motor and the second power motor output torque in opposite directions and with a same size; and alternatively, make the first power output set output the first output torque and the second power output set output the second output torque under a condition that the first power motor and the second power motor output torque with different sizes;

wherein the first power output set comprises a first straight gear, a second straight gear, a first bevel gear, a second bevel gear, a first belt pulley, a second belt pulley, a third belt pulley and a synchronous belt, wherein the first belt pulley and the second straight gear are connected to the first motor output shaft and the second motor output shaft in a relatively nonrotatable manner respectively, the second straight gear is in transmission connection to the first straight gear, the second belt pulley is coaxially connected to the first straight gear in a relatively nonrotatable manner, the synchronous belt is in transmission connection to the first belt pulley and the second belt pulley separately, the second straight gear is coaxially connected to the first bevel gear in a relatively nonrotatable manner, the second bevel gear is in transmission connection to the first bevel gear, and the third belt pulley is coaxially connected to the second bevel gear in a relatively nonrotatable manner.

20. A self-balancing power system, comprising:

a first drum unit, a second drum unit, a first battery pack, a second battery pack, a first power motor, a second power motor, a first power output set and a second power output set, wherein the first power output set is in transmission connection to one side of the first drum unit and one side of the second drum unit respectively, and the second power output set is in transmission connection to another side of the first drum unit and another side of the second drum unit, respectively;

the first power output set is configured to provide a first output torque of the self-balancing power system, and the second power output set is configured to provide a second output torque of the self-balancing power system;

wherein the self-balancing power system is configured to:

make the first power output set output no torque and the second power output set output the second output torque under a condition that the first power motor and the second power motor output torque in a same direction and with a same size; alternatively, make the first power output set output the first output torque and the second power output set output no torque under a condition that the first power motor and the second power motor output torque in opposite directions and with a same size; and alternatively, make the first power output set output the first output torque and the second power output set output the second output torque under a condition that the first power motor and the second power motor output torque with different sizes;

wherein the second power output set comprises a first belt pulley, a second belt pulley and a synchronous belt, wherein the first belt pulley and the second belt pulley are connected to the first transmission shaft and the second transmission shaft in a relatively nonrotatable manner respectively; and the synchronous belt is in transmission connection to the first belt pulley and the second belt pulley separately.

21. A self-balancing control method, configured to control the self-balancing power system according to claim 1, and comprising:

an obtaining step comprising obtaining a current speed, a preset speed, an inclination angle and a preset inclination angle range of the self-balancing power system;

a determination step comprising determining whether the current speed is consistent with the preset speed, and determining whether the inclination angle falls within the preset inclination angle range; and a control step comprising:

controlling a first power motor and a second power motor to output torque in a same direction and with a same size when it is determined that the current speed is consistent with the preset speed and the inclination angle does not fall within the preset inclination angle range, and making the first power output set output no torque and the second power output set output the second output torque; alternatively, controlling a first motor and a second motor to output no torque when it is determined that the current speed is consistent with the preset speed and the inclination angle falls within the preset inclination angle range, and making the first power output set output no torque and the second power output set output no torque; alternatively, controlling a first power motor and a second power motor to output torque in opposite directions and with a same size when it is determined that the current speed is inconsistent with the preset speed and the inclination angle falls within the preset inclination angle range, and making the first power output set output the first output torque and the second power output set output no torque; and alternatively, controlling a first motor and a second motor to output torque with different sizes when it is determined that the current speed is inconsistent with the preset speed and the inclination angle does not fall within the preset inclination angle range, and making the first power output set output the first output torque and the second power output set output the second output torque.

22. The self-balancing control method according to claim 21, wherein the controlling a first power motor and a second power motor to output torque in a same direction and with a same size comprises controlling output power of the first power motor and the second power motor to be the same, and controlling rotation directions of a first motor output shaft and a second motor output shaft to be the same.

23. The self-balancing control method according to claim 21, wherein the controlling a first power motor and a second power motor to output no torque comprises controlling output power of the first power motor and the second power motor to be zero.

24. The self-balancing control method according to claim 21, wherein the controlling a first power motor and a second power motor to output torque in opposite directions and with a same size comprises controlling output power of the first power motor and the second power motor to be the same, and controlling rotation directions of a first motor output shaft and a second motor output shaft to be opposite.

25. The self-balancing control method according to claim 21, wherein the controlling a first power motor and a second power motor to output torque with different sizes comprises controlling output power of the first power motor and the second power motor to be different.

26. The self-balancing control method according to claim 21, wherein an angle between a central axis plane and a vertical plane of the self-balancing power system is set as the inclination angle.

27. The self-balancing control method according to claim 21, wherein the inclination angle range is set to be 0°-10°, such that the inclination angle not falling within the preset inclination angle range comprises the inclination angle being greater than 10°, and the inclination angle falling within the preset inclination angle range comprises the inclination angle being less than or equal to 10°.

28. The self-balancing control method according to claim 21, wherein the inclination angle not falling within the preset inclination angle range comprises the inclination angle being unequal to 0°, and the inclination angle falling within the preset inclination angle range comprises the inclination angle being equal to 0°.

29. A self-balancing control system, configured to implement the self-balancing control method according to claim 21, and comprising:

an obtaining module configured to implement an obtaining step;

a processing module configured to implement a determination step; and a control module configured to implement a control step.

30. The self-balancing control system according to claim 29, wherein the obtaining module comprise an acceleration sensor and/or a speed sensor, the processing module comprises a processing unit, and/or the control module comprises a motor controller.

31. The self-balancing control system according to claim 30, wherein the acceleration sensor and/or the speed sensor is configured to measure or calculate a current speed and/or an inclination angle.

32. The self-balancing control system according to claim 30, wherein a preset speed and a preset inclination angle range are pre-stored in the self-balancing control system, and/or obtained from a controller of the self-balancing control system.

* * * * *